Oct. 15, 1957  A. D. BRUNDAGE  2,809,688
SEAT ADJUSTING MECHANISM
Filed July 21, 1953  4 Sheets-Sheet 1
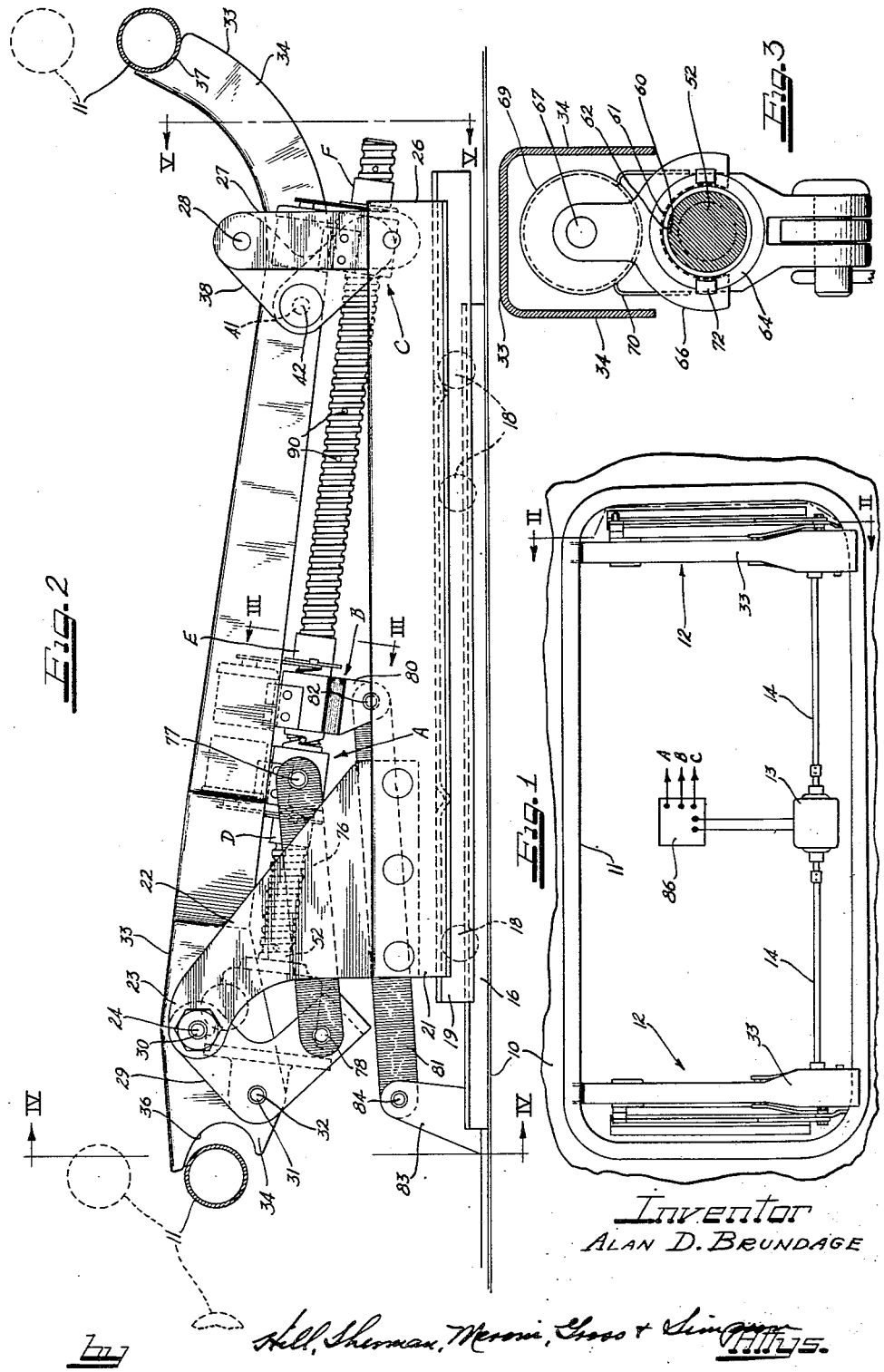
Inventor
ALAN D. BRUNDAGE Oct. 15, 1957  A. D. BRUNDAGE  2,809,688
SEAT ADJUSTING MECHANISM
Filed July 21, 1953  4 Sheets-Sheet 2
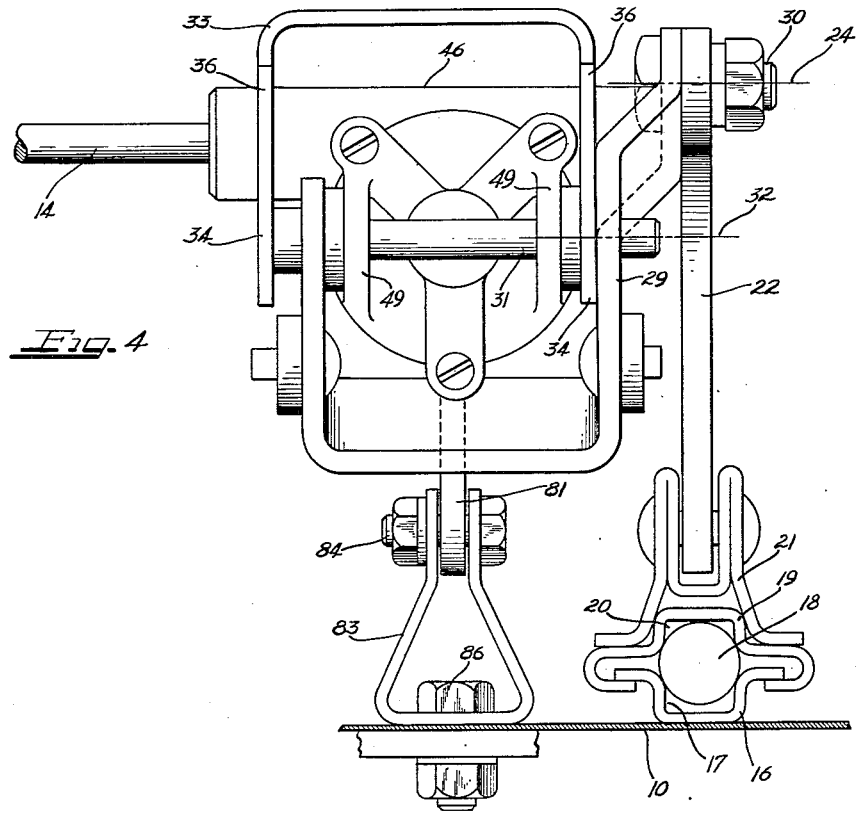
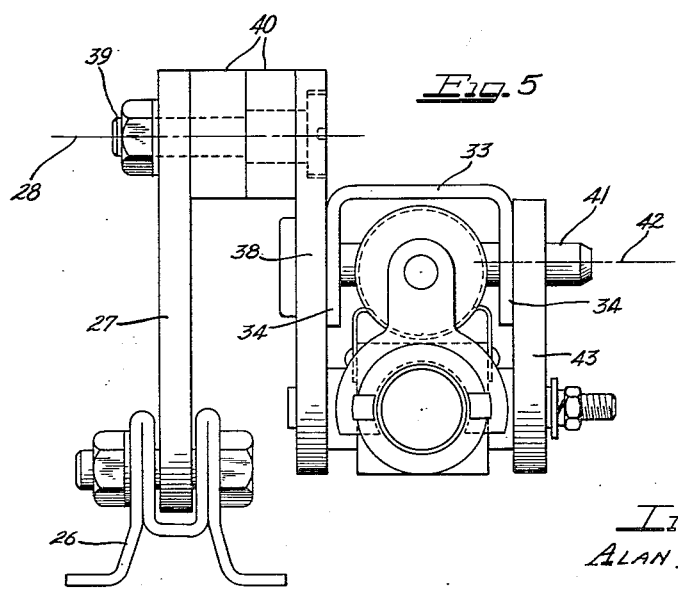
Inventor
ALAN D. BRUNDAGE
by Hill, Sherman, Meroni, Gross & Simpson
Attys.

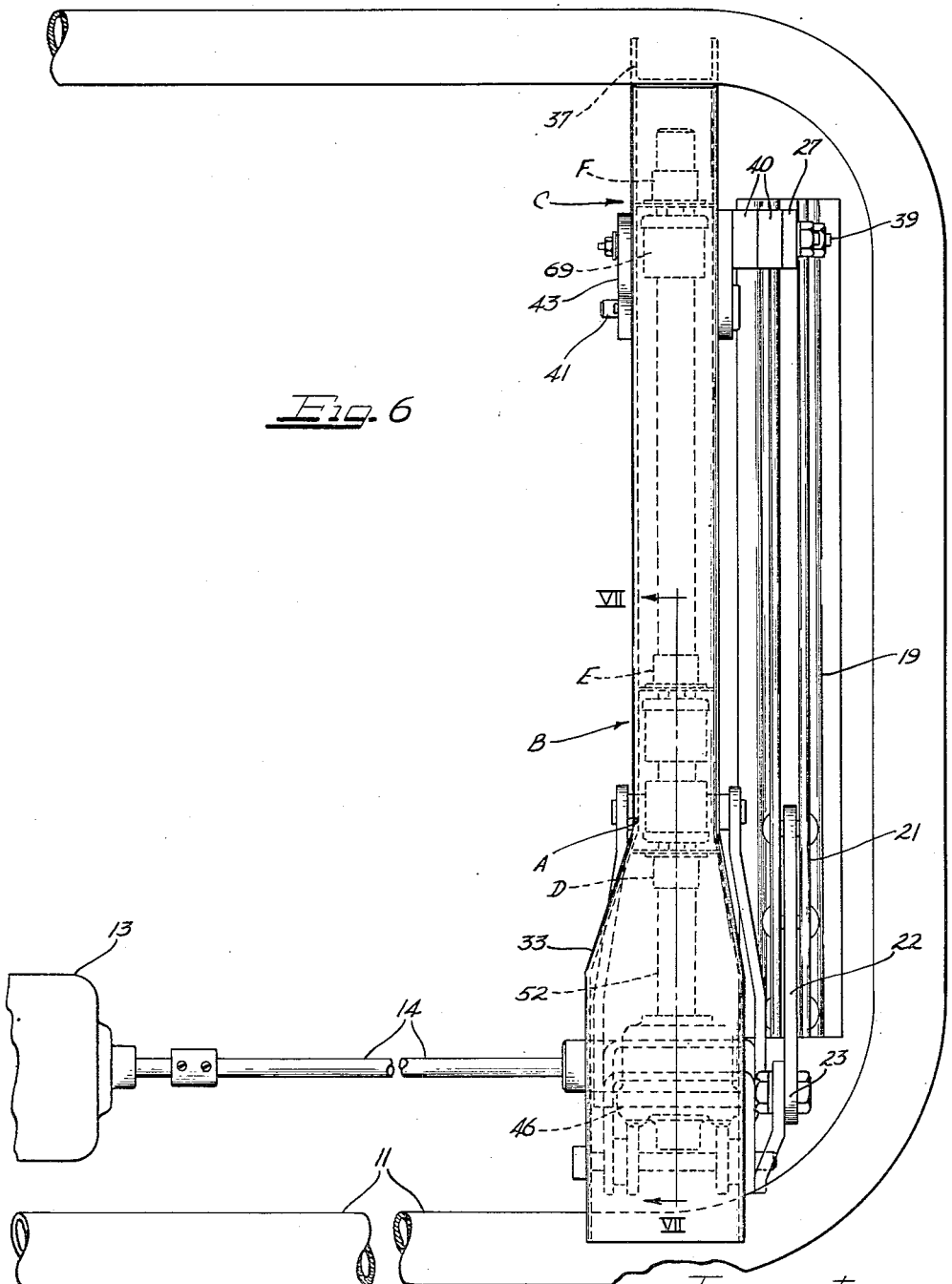

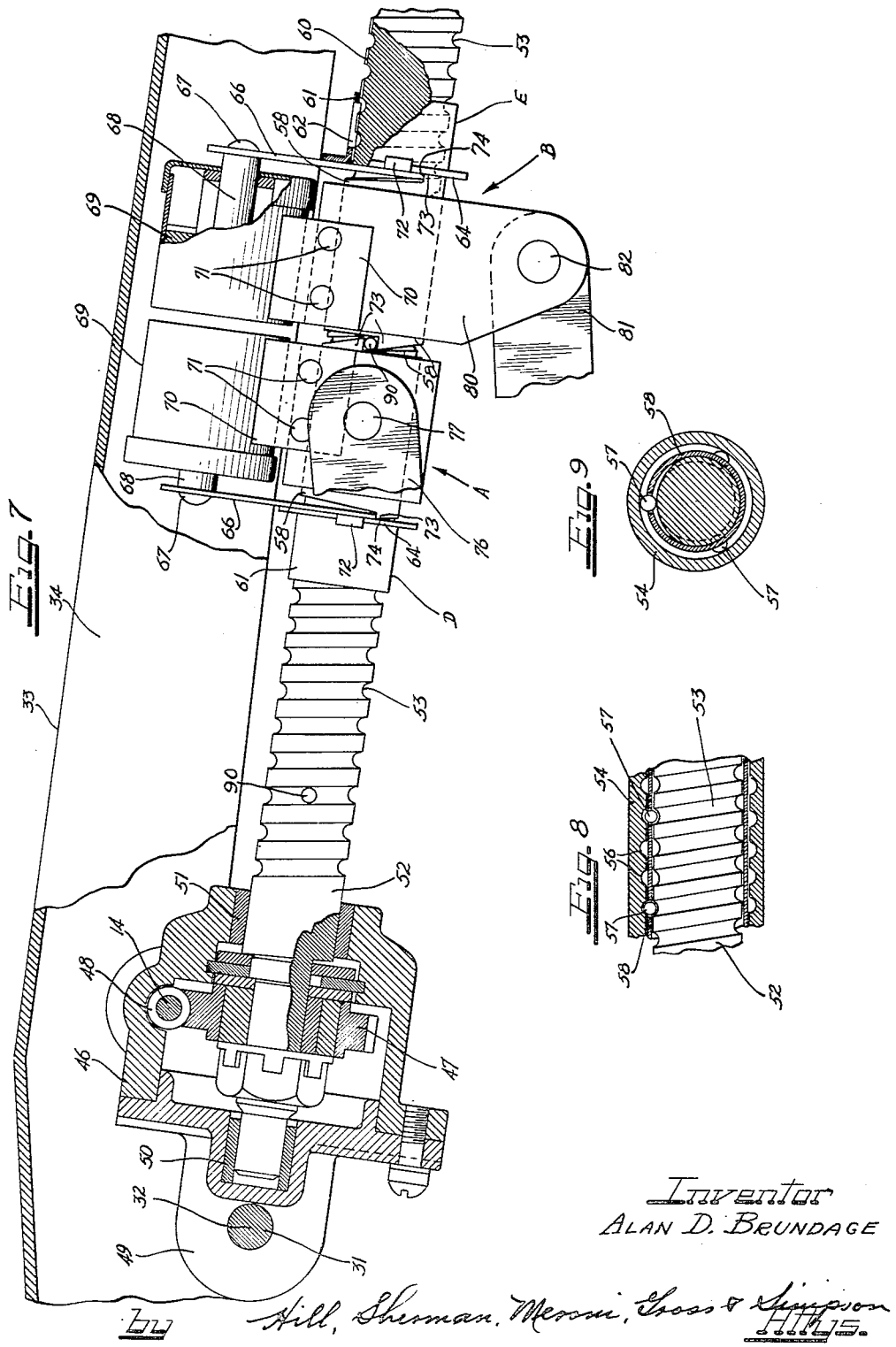

United States Patent Office 2,809,688
Patented Oct. 15, 1957

2,809,688

SEAT ADJUSTING MECHANISM

Alan D. Brundage, Birmingham, Mich., assignor to Houdaille Industries, Inc., a corporation of Michigan Application July 21, 1953, Serial No. 369,423

18 Claims. (Cl. 155—14)

This invention relates generally to a power operated mechanism for adjustably positioning a movable seat in an automotive vehicle, and more particularly relates to an improved actuating mechanism wherein a source of power supply such as an electric motor may be selectively operated to move a seat frame for adjustment upwardly and downwardly as well as forwardly and rearwardly, control means being provided to operatively idle the driving connections between the motor and the seat frame at the extreme limit positions of the seat frame so as to preclude damage to equipment and personnel.

According to the general principles of the present invention, an adjustable seat is mounted on the floor pan of an automotive vehicle and is provided with a seat frame having adjusting units at opposite ends thereof for adjustably actuating the seat frame forwardly and rearwardly as well as upwardly and downwardly.

Each of the actuating units comprises a trackway firmly secured on the floor pan of the automotive vehicle upon which is slidably mounted a support member having an upstanding bracket on the forward end and an upstanding bracket on the rear end thereof.

Depending from the forward and rear brackets is a front link arm and a rear link arm, respectively, the seat frame having pivotal attachments with the medial portions of each of the respective link arms so as to pivotally suspend the seat frame.

A mechanical movement is provided in accordance with the principles of the present invention to operatively actuate the suspended seat frame between adjusted movements. The mechanical movement comprises a pair of telescoping parts having confronting circumferential surface portions particularly characterized by a helical groove and an annular groove in the respective confronting surfaces, one of the grooves being provided by each respective part. Shiftable means taking the form of balls are simultaneously received or seated in the grooves and are movable through the helical groove to move the parts relatively axially.

A first rotatable sleeve is located between the telescoping parts and is provided with an aperture or apertures for the shiftable means. One of the parts preferably comprises a rotatable stem which is pivotally connected or supported to the seat frame and the other of the parts preferably comprises an annular collar telescoped over the stem. A second sleeve member is carried on the stem in co-rotatable assembly therewith and is also mounted for adjustable axial movement on the stem.

Coupling means are provided between the first sleeve and the second mentioned sleeve, for example, interengaging tongue and recess means. An electric motor is carried on the collar and has an actuating connection with the second mentioned sleeve to relatively move the sleeves into coupling engagement for rotating the first sleeve with the stem, thereby to limit movement of the shiftable means in the helical groove without restricting movement of the shiftable means in the annular groove.

In operation, as long as the sleeves are engaged, even though the stem is rotated in clockwise or counterclockwise direction, there will be no relative axial movement of the collar with respect to the stem. However, upon control of the motor on the collar, disengagement of the sleeves will permit movement of the shiftable means through the helical groove to afford relative axial movement between the telescoping parts.

In the embodiment herein described, three separate pairs of telescoping parts are provided through the utilization of a single stem with three longitudinally spaced collars. Each of the collar units is identical in construction to one another.

One of the collars is provided with a pivot link which inter-connects the collar with the front link arm, thereby to convert relative translatory movement of the collar and the stem into pivotal movement of the seat frame relative to the front bracket.

A second collar is provided with a pivot link attachment to the stationary floor pan of the vehicle so that relative translatory movement of the collar and the stem will result in translatory displacement of the seat frame relative to the stationary floor pan. Thus, upon controlling the first mentioned collar unit, the seat will be adjusted upwardly and downwardly and upon controlling the second mentioned collar unit the seat will be adjusted forwardly and rearwardly.

The third collar is pivotally connected to the rear link depending from the rear bracket and operates as a compensating means for the adjustment of the seat frame when the first mentioned collar units are actuated.

According to the principles of the present invention, each of the actuating units includes a gear box which may be supplied with operating power by a common electric motor located between the opposite ends of the adjustable seat mechanism. The common electric operating motor selectively rotates the stems so that concurrent energization of each of the respective actuating motors carried by the collars will permit the shiftable means to move in the helical threads thereby to relatively translate the collars and the stems between limit positions corresponding to the forwardmost and rearwardmost positions of the seat and to the uppermost and lowermost positions of the seat, the parts being moved in selected direction in accordance with the rotational direction of the stems. The shiftable means are movable in the annular grooves to effectively idle the driving connections between the movable parts and the electric operating motor and the relative limit positions of the parts.

It is an object of the present invention to provide a seat adjusting mechanism for positioning a movable seat selectively between forward and rearward positions and between upper and lower positions.

Another object of the present invention is to provide an improved electrically operated seat adjusting mechanism.

A further object of the present invention is to provide a seat adjusting mechanism which permits universal adjustment but which does not require a complicated control system necessitating the use of safety limit switches and the like.

Yet another object of the present invention is to provide an electric seat adjusting mechanism which will adjust a movable seat between extreme positions and which includes a source of power supply which will be effectively idled at the extreme adjusted positions of the seat.

Another object of the present invention is to provide a power actuated seat mechanism which may be adjusted upwardly and downwardly.

Many other features, advantages and additional objects of the present invention will become manifest to those versed in the art upon making reference to the detailed description which follows and the accompanying sheets of drawings in which a preferred structural embodiment of a seat adjusting mechanism incorporating the principles of the present invention is shown by way of illustrative example.

On the drawings:

Figure 1 is a somewhat diagrammatic plan view of a seat adjusting mechanism provided in accordance with the principles of the present invention;

Figure 2 is a somewhat enlarged cross-sectional view taken substantially on line II—II of Figure 1 showing details of construction of one of the actuating units provided in accordance with the principles of the present invention;

Figure 3 is a somewhat enlarged cross-sectional view taken substantially on line III—III of Figure 2;

Figure 4 is a somewhat enlarged fragmentary end view taken in the direction of the arrows indicated on section IV—IV of Figure 2;

Figure 5 is an end view taken in the direction of the arrows indicated on section V—V of Figure 2;

Figure 6 is an enlarged fragmentary plan view of one of the actuating units provided in accordance with the principles of the present invention;

Figure 7 is a fragmentary cross-sectional view with parts broken away and with parts shown in elevation taken substantially on line VII—VII of Figure 6;

Figure 8 is a fragmentary cross-sectional view illustrating additional structural details of the actuating unit;

Figure 9 is a cross-sectional view on a transverse plane with respect to Figure 8.

As shown on the drawings:

The disclosure of the present application is a continuation-in-part of my copending application entitled Seat Adjusting Mechanism, Serial No. 273,741, filed February 27, 1952. In my copending application Serial No. 273,741, there is disclosed the provision of a seat adjusting mechanism particularly suited for use with a seat having a movable frame and adapted to be adjusted by the operator of an automotive vehicle forwardly and backwardly with respect to a stationary floor pan forming a part of the automotive vehicle.

In the present disclosure, a seat adjusting mechanism is provided which is particularly suited for use with a seat having a movable frame adapted to be adjusted by the operator of an automotive vehicle forwardly and backwardly with respect to a stationary floor pan and also upwardly and downwardly with respect to the stationary floor pan forming a part of the automotive vehicle.

As is indicated in Figures 1 and 2, a stationary floor pan of an automotive vehicle is indicated generally by the reference numeral 10 and mounts a movable seat frame 11 for adjustable movement with respect thereto.

Identical adjusting units are located at opposite ends of the seat frame 11 and are indicated generally by the reference numeral 12. A common electric drive motor 13 is located intermediate the opposite ends of the seat frame 11 and has oppositely extending power takeoff shafts 14, 14 which are operatively connected to each of the adjusting units 12 in a manner to be described in greater detail hereinafter.

It is believed that a description of one of the actuating units 12 will be sufficient for the purposes of the present disclosure and similar reference numerals will be applied to the components of both actuating units 12 wherever practicable.

A trackway member 16 is secured in firm assembly to the stationary floor pan 10 and provides a groove 17 seating a plurality of shiftable elements 18. A movable support member 19 complementally grooved as at 20 rides on the shiftable elements 18 for forward and backward movement relative to the floor pan 10.

Firmly assembled to the support member 19 is a front bracket 21 having an upstanding portion 22 providing an overhanging arm 23 suitably apertured to establish a pivot axis indicated at 24.

At the rear of the support member 19 and spaced from the front bracket 21 is provided a rear bracket 26 having an upstanding portion 27 apertured to establish a pivot axis 28.

A front link arm or bracket 29 of generally L-shaped configuration is pivotally attached at one end to the overhanging arm 23 by means of a pin 30 for pivotal movement relative to the pivot axis 24. At the apical portion of the front link arm or bracket 29 is connected a pivot pin 31 establishing a pivot axis 32. As seen upon referring to Figure 4 in connection with Figure 2, a bracket member 33 comprising a sheet form member bent in a generally U-shaped configuration has spaced leg portions 34 which are recessed as at 36 to engage the seat frame 11 which, in this embodiment takes the form of a tube shaped to provide a continuous rectangular loop.

The rear end of the support bracket 33 is recessed as at 37 to receive the rear leg of the seat frame 11.

Depending from the upstanding portion 27 of the rear bracket 26 is a rear link arm 38, a pivot pin 39 being provided to afford pivotal movement of the rear link arm 38 with respect to the pivot axis 28. Spacer means are indicated at 40 between the upstanding portion 27 and the link arm 38 to afford clearance.

The link arm 38 is of generally L-shaped configuration and at the apical portion thereof a pivotal attachment is made to the support bracket 33, a pivot pin 41 being provided establishing a pivot axis 42. The pivot pin 41 extends through the link arm 38 and through the opposed leg portions 34 of the support bracket 33. A clamping bar 43 is spaced from the rear link arm 38 and forms together therewith a support structure for a purpose to be described in greater detail hereinafter.

It will be evident that the seat frame 11 is effectively suspended from the front and rear brackets 21 and 26 and may be adjusted upwardly and downwardly by rotating the front and rear link arms 29 and 38 about the pivot axes 24 and 28, respectively.

In accordance with the principles of the present invention, a mechanical movement is provided for each adjusting unit 12 to control the adjustable positioning of the seat frame 11.

As shown in Figures 1, 4 and 7, each of the power takeoff shafts 14 is operatively connected to one of the respective mechanical movements at a gear box 46 housing a rotatable gear 47 meshed with a worm 48 driven by the power takeoff shaft 14.

Each respective gear box 46 is provided with spaced boss portions 49 suitably apertured to pass the pivot pin 31 for pivotally supporting the gear box 46 for pivotal movement relative to the pivot axis 32.

Spaced bearing means indicated at 50 and 51 respectively are carried in the gear box 46 and journal a rotatable stem 52 connected in co-rotatable assembly with the gear 47. The stem 52 extends outwardly of the gear box 46 generally parallel to the support bracket 33.

Three separate collar units indicated generally by the reference characters A, B and C are spaced longitudinally along the length of the stem 52 and are of identical construction except for certain appendages to be described and identified in greater detail hereinafter. Accordingly, a detailed description of only one of the collar units will suffice for all three in regard to the common components thereof and similar reference numerals will be applied to such common components wherever practicable.

In its broadest aspect, each respective collar unit and the stem 52 together form a pair of telescoping parts or, coaxial inner and outer relatively rotatable concentrically disposed parts which provide respectively a peripheral surface and a bore surface confronting one another.

One or a plurality of concentric circumferentially continuous annular grooves are provided in one of the confronting surfaces on one of the parts. A concentric helical groove is provided in the other confronting surface on the other of the parts.

In the particular embodiment herein shown, the peripheral surface of the stem 52 is provided with the concentric helical groove indicated at 53.

As is clearly shown in Figures 8 and 9, the collar units A, B and C each include an annular ring 54 providing an internal bore surface having a plurality of axially spaced concentric circumferentially continuous annular grooves 56.

Shiftable means are simultaneously received in the annular grooves 56 and in the helical groove 53 and in this embodiment the shiftable means takes the form of a plurality of balls 57.

A sleeve 58 comprising a sheet of material rolled into a tubular configuration having an inner diameter corresponding approximately to the outer diameter of the stem 52 is located between the stem 52 and the ring 54.

The sleeve 58 is provided with a plurality of apertures preferably arranged as pairs of longitudinally spaced apertures with respective pairs of apertures being staggered or offset so as to correspond to the thread lead of the helical thread 53 provided in the stem 52. Each of the apertures retains one of the shiftable elements or balls 57.

Upon rotation of the stem 52, the balls 57 will move through the helical groove 53 thereby driving the collar ring 54 along a linear path of displacement with respect to the stem 52. In other words, the parts will be relatively translated.

As is explained in considerable detail in my copending application Serial No. 273,741, the balls will move through the annular grooves 56 and the stem 52 will be rotatably idled with respect to each respective collar ring 54 whenever a corresponding sleeve 58 becomes co-rotatable with the stem 52.

In accordance with the principles of the present invention, a separate electric motor is provided for each of the collar units A, B and C to effect an actuating control of the respective sleeves 58 upon selective energization of the motors whereby the relative translation of the collar units A, B and C and the stem 52 may be controlled electrically.

Referring particularly to Figure 7, it will be noted that the stem 52 is provided with a longitudinally extending groove 60. Adjacent each collar unit A, B and C is a sleeve indicated by the reference characters D, E and F, respectively.

Each of the sleeves D, E and F comprises a generally tubular shaped member 61 having an inner diameter approximately the same as the outer diameter of the stem 52 so as to permit axial movement relative to the stem 52. Each sleeve member 61 has a radially inwardly extending tang or key 62 received in the groove 60 to make the sleeve members 61 co-rotatable with the stem 52 as the sleeve members 61 are axially positioned relative to the stem 52.

As shown in Figures 3 and 7, the sleeve members 61 are flanged as at 64 and are axially positioned by means of a yoke member 66 securely fastened by a rivet 67 to the armature 68 of a solenoid motor 69 carried in firm assembly with each respective collar unit A, B and C by means of a bracket 70 having fasteners 71 passing therethrough.

The yoke member 66 is provided with slip clip members 72 extending radially inwardly to slidably cooperate with the radially outwardly extending flange 64 on each of the sleeve members 61.

As shown in Figure 7, inter-connecting means are provided between each respective sleeve member 61 and a corresponding sleeve member 58. The inter-connecting means may conveniently comprise a mating lug and recess indicated at 73 and at 74, respectively. As long as each respective sleeve 58 and sleeve member 61 is engaged through the lug and recess 73 and 74, even though the stem 52 turns in clockwise direction or counter-clockwise direction, there will be no relative movement of the corresponding collar ring 54 and the stem 52. If the sleeve member 61 is disengaged from the corresponding sleeve member 58, selective rotation of the stem member 52 will result in a relative translation of the corresponding collar ring 54 in selected direction along the length of the stem 52.

By virtue of the provisions made in accordance with the principles of the present invention, it is possible to have a plurality of collar units A, B and C on the single stem 52 and through the utilization of control circuit means including the respective solenoid motors 69 for each of the collar units A, B and C, the collar units may be selectively traversed on the stem 52 singly or in combinative pairs.

Referring further to Figure 2, it will be noted that a link member 76 is provided which has one end pivotally connected to the collar unit A by means of a pivot pin 77 and the other end is pivotally connected to the lowermost end of the front link arm or bracket 29 by means of a pivot pin 78. Thus, when the collar unit A is advanced on the stem 52 toward the left as viewed in Figure 2, the link 76 will push the front link arm or bracket 29 to effect pivotal displacement thereof around the pivot axis 24 whereupon the seat frame 11 will be elevated from the full line position shown in Figure 2 to the dotted line position shown in Figure 2 or to any intermediate position. Movement of the collar unit A on the stem 52 in an opposite direction will lower the seat frame between the extreme limit positions or at any intermediate position.

The collar unit B is provided with a depending boss 80 to which a link 81 is pivotally connected at one end by means of a pivot pin 82, the other end of the link 81 being pivotally connected to a bracket 83 by means of a pivot pin 84. As is clearly shown in Figure 4, the bracket 83 is connected in firm assembly with the floor pan 10 by suitable fastening means indicated at 85.

When collar unit B is translated with respect to the stem 52 toward the right as viewed in Figure 2, the seat frame 11 will be moved from the rear full line position of Figure 2 to the forward dotted line position of Figure 2 thereby to effect forward and rearward adjustment between extreme limit positions or any intermediate selected position.

The collar unit C is clamped to the support structure formed by the link arm 38 and the clamping bar 43, thereby connecting the collar unit C to the linkage for height adjustment of the seat.

When collar unit C is translated to the left as viewed in Figure 2, the link arm 38 will be pivotally displaced about the pivot axis 28 and, accordingly, the pivotal axis 42 will travel through an arc describing a locus about the pivot axis 28, thereby raising the seat frame from the full line position of Figure 2 to the dotted line position of Figure 2.

The pivotal attachment thus effected between the collar unit C and the support bracket 33 and the upstanding portion 27 of the rear bracket 26 functions as a compensating means for the adjustment displacement of the seat frame 11 when the collar units A and B are relatively translated with respect to the stem 52.

As is indicated diagrammatically in Figure 1, a circuit control means 86 is provided to effect selective energization of the motor 13 and of each of the solenoid motors 69 associated with the respective collar units A, B and C and it will be apparent from the detailed description hereinabove set forth that selective energization of the various motor units will effect selective positioning of the seat frame 11 forwardly and rearwardly as well as upwardly and downwardly between extreme limit positions and at any intermediate position.

As is more fully set forth in my copending application acknowledged above, limit stops are established by axially spaced pins 90 which are carried by the stem 52 and which cooperate with the sleeves 58 to idle the mechanism at the end positions.

Although various minor modifications might be suggested by those versed in the art, it should be understood that I wish to embody within the scope of the patent warranted hereon all such modifications as reasonably and properly come within the scope of my contribution to the art.

I claim as my invention:

1. In combination, a movable seat frame and a seat adjusting mechanism carrying said seat frame and having a pair of spaced apart actuating units at opposite ends of said seat frame, each unit comprising a stem forming a rotatable inner part and a plurality of collars on said stem each forming an outer part, said inner and outer parts each providing a peripheral surface and a bore surface, respectively, confronting one another, a helical groove in one of said surfaces on one of said parts, a circumferential continuous annular groove in the other of said surfaces on the other of said parts, a ball simultaneously received in said grooves, a retainer sleeve between said surfaces to retain said ball, control circuit means including a motor on each collar having an actuating member operatively engageable with each respective sleeve to limit the travel of said ball in said helical groove without restricting movement of said ball in said continuous annular groove, said control circuit means further including a drive motor to rotate said stem, whereby selective energization of said motors concurrently with energization of said drive motor will selectively axially position said collars on said stem.

2. In combination, a seat frame, and a seat adjusting mechanism supporting said frame and comprising adjusting units at opposite ends of said frame, each unit including a trackway, a support member slidable on said trackway and having a forward bracket and a rear bracket, a first forward lever arm having one end pivotally connected to said forward bracket and being intermediately pivotally connected to said seat frame, a rear lever arm having one end pivotally connected to said rear bracket and being intermediately pivotally connected to said seat frame, a stem pivotally supported at one end by said seat frame, three collars on said stem, a second forward lever arm pivotally connected at one end to one of said collars and having the other end thereof pivotally connected to the other end of said first forward lever arm, a third forward lever arm pivotally connected at one end of said trackway and pivotally connected at the other end to a second collar of said three collars, said rear lever arm having its other end pivotally connected to the third collar of said three collars, and means to selectively axially position said collars on said stem, whereby movement of said second collar relative to said stem will move the seat frame forwardly and rearwardly, and movement of the first and third collars relative to said stem will move the seat frame upwardly and downwardly.

3. In combination, a seat frame, and a seat adjusting mechanism supporting said frame and comprising adjusting units at opposite ends of said frame, each unit including a trackway, a support member slidable on said trackway and having a forward bracket and a rear bracket, a first forward lever arm having one end pivotally connected to said forward bracket and being intermediately pivotally connected to said seat frame, a rear lever arm having one end pivotally connected to said rear bracket and being intermediately pivotally connected to said seat frame, a stem pivotally supported at one end by said seat frame, three collars on said stem, a second forward lever arm pivotally connected at one end to one of said collars and having the other end thereof pivotally connected to the other end of said first forward lever arm, a third forward lever arm pivotally connected at one end of said trackway and pivotally connected at the other end to a second collar of said three collars, said rear lever arm having its other end pivotally connected to the third collar of said three collars, and means to selectively axially position said collars on said stem, whereby movement of said second collar relative to said stem will move the seat frame forwardly and rearwardly, and movement of the first and third collars relative to said stem will move the seat frame upwardly and downwardly, said stem and said collars each providing confronting surfaces particularly characterized by having formed therein a helical groove in one surface and an annular groove in the other surface, a ball simultaneously received in each of said grooves, a sleeve for each collar between said surfaces and retaining a corresponding ball, movement of said balls and said helical groove operating to drive each corresponding collar axially with respect to said stem and means selectively connecting said sleeves for co-rotation with said stem to limit movement of said balls in said helical groove without restricting movement of said balls in said annular grooves.

4. In combination, a seat frame, and a seat adjusting mechanism supporting said frame and comprising adjusting units at opposite ends of said frame, each unit including a trackway, a support member slidable on said trackway and having a forward bracket and a rear bracket, a first forward lever arm having one end pivotally connected to said forward bracket and being intermediately pivotally connected to said seat frame, a rear lever arm having one end pivotally connected to said rear bracket and being intermediately pivotally connected to said seat frame, a stem pivotally supported at one end by said seat frame, three collars on said stem, a second forward lever arm pivotally connected at one end to one of said collars and having the other end thereof pivotally connected to the other end of said first forward lever arm, a third forward lever arm pivotally connected at one end of said trackway and pivotally connected at the other end to a second collar of said three collars, said rear lever arm having its other end pivotally connected to the third collar of said three collars, and means to selectively axially position said collars on said stem, whereby movement of said second collar relative to said stem will move the seat frame forwardly and rearwardly, and movement of the first and third collars relative to said stem will move the seat frame upwardly and downwardly, said stem and said collars each providing confronting surfaces particularly characterized by having formed therein a helical groove in one surface and an annular groove in the other surface, a ball simultaneously received in each of said grooves, a sleeve for each collar between said surfaces and retaining a corresponding ball, movement of said balls in said helical groove operating to drive each corresponding collar axially with respect to said stem and means selectively connecting said sleeves for co-rotation with said stem to limit movement of said balls in said helical groove without restricting movement of said balls in said annular grooves, said last mentioned means comprising control circuit means including a motor on each collar having an acttuating member operatively engaged with each respective sleeve, said control circuit means further including a motor to rotate said stem, whereby selective energization of said motors will selectively axially position said collars on said stem.

5. In combination, a seat frame, and means to move said seat frame upwardly and downwardly comprising adjusting units at opposite ends of said frame, a mechanical movement for each adjusting unit to control the adjustable positioning of said frame, each unit including, a support member having a bracket, a link arm pivotally connected to said bracket and having a medial pivot connection with said seat frame, a stem pivotally supported at one end by said seat frame, a collar on said stem, and a second link arm having one end pivotally connected to said collar and having its other end pivotally connected to the other end of said first link arm, and means to axially position said collar on said stem, thereby to pivotally displace said seat frame for raising and lowering said seat frame.

6. In combination, a seat track having a support member slidable forwardly and rearwardly thereon, a first front link member pivotally attached at one end to and depending from said support member at a first pivot axis, a seat frame, said front link member having a medial pivotal connection to said seat frame at a second pivot axis, a stem means pivotally connected to said seat frame on said second pivot axis and having a stem extending rearwardly from said axis, a second front link member, a collar on said stem having a pivotal attachment to one end of said second front link member at a third pivot axis, and a pivotal attachment between the other end of said second front link member and the other end of said first front link member at a fourth pivot axis, and means to move said collar on said stem in selected direction to pivot said first front link member around said first pivot axis in response to movement of said second front link member, thereby to raise and lower said seat frame.

7. In an adjustable seat mechanism, support means including a stationary support frame providing a trackway and a slidable cradle carried on said trackway for forward and rearward adjustment, a forward and a rear bracket carried on said support frame in spaced apart relation to one another, a forward and a rear link arm pivotally attached to and depending from each corresponding forward and rear bracket, a seat frame pivotally attached to said link arms, and relatively translatable actuating parts carried by said seat frame having an operative driving connection with said link arms to pivotally raise and lower said seat frame upon relative translation of said parts.

8. In an adjustable seat mechanism, support means including a stationary support frame providing a trackway and a slidable cradle carried on said trackway for forward and rearward adjustment, a forward and a rear bracket carried on said support frame in spaced apart relation to one another, a forward and a rear link arm pivotally attached to and depending from each corresponding forward and rear bracket, a seat frame pivotally attached to said link arms, and relatively translatable actuating parts carried by said seat frame having an operative driving connection with said link arms to pivotally raise and lower said seat frame upon relative translation of said parts, and a separate link arm pivotally attached to said stationary support frame and having an operative driven connection with said parts to slidably adjust said cradle on said trackway forwardly and rearwardly.

9. A seat comprising a seat frame having adjustment actuating means comprising front and rear link arms pivotally connected to said seat frame, a support bracket pivotally attached to said link arms and suspending said seat frame for pivotal movement, a mechanical movement carried by said seat frame including a stem having a helical groove in the peripheral surface thereof, first and second collars on said stem each providing a plurality of internal annular grooves confronting said helical groove, a plurality of balls in each collar simultaneously received in said annular grooves and said helical groove, a sleeve for each collar between each collar and said stem and having apertures therein for said balls, an inter-connecting link arm inter-connecting said first collar and said front link arm to pivot said seat frame upwardly and downwardly in response to relative translation of said first collar and said stem, a pivotal connection between said second collar and said rear link arm, control circuit means including motor means having a driving connection with said stem to rotate said stem in selected direction, and separate motor means for each collar, each of said separate motor means having an operative actuating connection with a corresponding sleeve to limit movement of said balls in said helical groove without restricting movement of said balls in said annular grooves.

10. A seat comprising a track, a seat frame movable on said track and having adjustment actuating means comprising front and rear link arms pivotally connected to said seat frame, a support bracket pivotally attached to said link arms and suspending said seat frame for pivotal movement, a mechanical movement carried by said seat frame including a stem having a helical groove in the peripheral surface thereof, first, second and third collars on said stem each providing a plurality of internal annular grooves confronting said helical groove, a plurality of balls in each collar simultaneously received in said annular grooves and said helical groove, a sleeve for each collar between each collar and said stem and having apertures therein for said balls, an inter-connecting link arm inter-connecting said first collar and said front link arm to pivot said seat frame upwardly and downwardly in response to relative translation of said first collar and said stem, a pivotal connection between said second collar and said rear link arm, control circuit means including motor means having a driving connection with said stem to rotate said stem in selected direction, and separate motor means for each collar, each of said separate motor means having an operative actuating connection with a corresponding sleeve to limit movement of said balls in said helical groove without restricting movement of said balls in said annular grooves, means adapted to inter-connect the support bracket and said third collar to move said seat frame forwardly and backwardly upon relative translation of said third collar and said stem.

11. In a mechanical movement, a pair of telescoping parts having confronting circumferential surface portions particularly characterized by a helical groove and an annular groove in the respective confronting surfaces of said parts, a ball simultaneously seated in both of said grooves and movable through said helical groove upon relative rotation of said parts to move said parts relatively axially, and a first rotatable sleeve between said parts having an aperture for said ball, one of said parts comprising a rotatable stem and the other part comprising an annular collar, a second sleeve carried on said stem for co-rotation therewith and for adjustable axial movement thereon, coupling means between said sleeves, and a motor on said collar having an actuating connection with said second sleeve to relatively move said first and second sleeves into coupling engagement for rotating said first sleeve with said stem, thereby to limit movement of said ball in said helical groove without restricting movement thereof in said annular groove.

12. A mechanical movement comprising coaxial inner and outer relatively rotatable concentrically disposed parts providing respectively a peripheral surface and a bore surface confronting one another, a concentric helical groove provided in one of said confronting surfaces on one of said parts, a concentric circumferentially continuous groove provided in one of said confronting surfaces on the other of said parts, a ball simultaneously received in both of said grooves and serving to operatively inter-connect said parts and moving in said helical groove upon relative rotation of said parts to effect relative axial movement of said parts in response to such relative rotation, said ball being free to move in said continuous groove about the axis of said parts, and means limiting the movement of said ball in said helical groove including an electric solenoid motor carried on said outer member and having an actuating member reciprocable axially with respect to said parts being selectively and operatively connected to said ball to limit movement of said ball in said continuous groove upon energization of said solenoid motor, whereby relative axial movement of said parts may be selectively controlled by relative energization of said solenoid motor.

13. A mechanical movement comprising coaxial inner and outer relatively rotatable concentrically disposed parts, there being one inner part in a plurality of axially spaced outer parts, said inner and outer parts each providing respectively a peripheral surface and a bore surface for confronting one another, a concentric helical groove provided in one of each respective pair of confronting surfaces, a concentric circumferentially continuous groove provided in the other of each respective pair of confronting surfaces, shiftable means simultaneously received in said grooves of each respective pair of grooves for movement in said grooves and serving to operatively interconnect said inner and outer parts, retainer means for each outer part holding said shiftable means between each corresponding outer part and said inner part to limit the movement of each respective shiftable means through the corresponding helical groove in effecting relative axial movement of each pair of parts, an electric actuating motor on each outer part operatively connected to each corresponding retainer means to control relative axial movement of each outer part and said inner part as a function of the energization of the motor, and a separate motor for relatively rotating said parts, and control means for selectively energizing said actuating motors concurrently with said separate motor to selectively axially position said parts.

14. In a mechanical movement, a pair of telescoping parts having confronting circumferential surface portions particularly characterized by a helical groove and an annular groove in the respective surfaces of said parts, a ball simultaneously seated in each groove and movable through said helical groove upon relative rotation of said parts to move said parts relatively axially, a first rotatable sleeve between said parts having an aperture for said ball, one of said parts comprising a rotatable stem and the other part comprising an annular collar, a second sleeve carried on said stem adjacent said annular collar and being co-rotatable with said stem and mounted on said stem for adjustable axial movement, coupling means between said sleeves, an electric motor on said collar having an actuating connection with said second sleeve to relatively move said sleeves into coupling engagement for selectively rotating said first sleeve with said stem, thereby to limit movement of said ball in said helical groove without restricting movement thereof in said annular groove, and an electric motor for rotating said stem in selected angular direction, whereby energization of said motors will control axial positioning of said parts.

15. In a mechanical movement of the type including inner and outer parts having formed therebetween a concentric helical groove and a concentric circumferentially continuous annular groove with at least one ball simultaneously seated in both grooves, a cage member interposed between said parts maintaining the ball in predetermined position in said grooves, the improvement of locking means fixed with respect to one of said parts and including means to selectively lock said cage member either with said inner part or with said outer part, thereby to selectively limit movement of the ball in said helical groove at any selected position along the length of said groove.

16. In a mechanical movement as defined in claim 15, said locking means including an electric actuating motor and circuit means for selectively controlling the energization of said motor.

17. In a seat adjuster of the type including inner and outer parts adapted to be connected to and between an adjustable seat and a support therefore, the parts having formed therebetween a concentric helical groove and a concentric circumferentially continuous annular groove with at least one ball simultaneously seated in both grooves and with a cage member interposed between said parts to maintain the ball in predetermined position, the improvement of locking means fixed with respect to one of said parts and including means to selectively lock said cage member either with said inner part or with said outer part thereby to selectively limit movement of the ball in said helical groove at any selected position along the length of said helical groove for effecting adjustment of the seat.

18. In an adjustable seat structure of the type including a seat, carriage means supporting the seat for adjustable movement, inner and outer parts connected to and between the seat and a support therefore and having formed therebetween a concentric helical groove and a concentric circumferentially continuous annular groove with at least one ball simultaneously seated in both grooves and with a cage member interposed between the parts to maintain the ball in predetermined position, a two directional electric motor connected to one of the parts, and switch means in control of said motor to energize said motor for rotation in selected direction, the improvement of locking means fixed with respect to one of said parts and, including means to selectively lock said cage member either with said inner part or with said outer part thereby to selectively limit movement of the ball in said helical groove at any selected position along the length of said helical groove for effecting adjustment of said seat.

References Cited in the file of this patent

UNITED STATES PATENTS

| | | |
|---|---|---|
| 2,345,182 | Corber | Mar. 28, 1944 |
| 2,446,393 | Russell | Aug. 3, 1948 |
| 2,481,129 | Tourneau | Sept. 6, 1949 |
| 2,588,165 | Rossmann | Mar. 4, 1952 |
| 2,590,251 | Hoover | Mar. 25, 1952 |
| 2,609,029 | Haberstump | Sept. 2, 1952 |
| 2,630,159 | Fifield | Mar. 3, 1953 |
| 2,630,719 | Humbert et al. | Mar. 10, 1953 |
| 2,641,305 | Oishei | June 9, 1953 |
| 2,707,137 | Hollstein | Apr. 26, 1955 |